United States Patent
Moran et al.

[15] 3,680,385
[45] Aug. 1, 1972

[54] DIAL THERMOMETER

[72] Inventors: Robert J. Moran, Littleton; Louis P. Marsilia, East Boston, both of Mass.

[73] Assignee: Cardinal Instrument Corporation, Cambridge, Mass.

[22] Filed: July 20, 1970

[21] Appl. No.: 56,349

[52] U.S. Cl. ................................. 73/368.4, 73/420
[51] Int. Cl. ............................................. G01k 5/42
[58] Field of Search ....... 73/368.7, 368.2, 371, 368.4, 73/368.7, 420; 188/82.6, 82.7; 116/129 A, 129 B

[56] References Cited

UNITED STATES PATENTS

| 1,671,985 | 6/1928 | Goosmann | 73/368.7 X |
| 3,182,506 | 5/1965 | Schmans | 73/368.7 X |
| 2,263,103 | 11/1941 | Rathbun | 73/368.7 X |
| 2,404,596 | 7/1946 | Roche, Jr. | 73/368.7 X |
| 470,551 | 3/1892 | Crawford | 188/82.7 X |
| 2,531,948 | 11/1950 | Road | 116/129 A |
| 2,513,184 | 6/1950 | Lamb | 116/129 A X |
| 2,894,605 | 7/1959 | Leavitt | 188/82.6 X |
| 3,218,861 | 11/1965 | Moore et al. | 73/371 |
| 3,178,944 | 4/1965 | Templeton | 73/420 |

*Primary Examiner*—Louis R. Prince
*Assistant Examiner*—Daniel M. Yasich
*Attorney*—Morse, Altman & Oates

[57] ABSTRACT

A precision thermometer is provided for medical use. The thermometer is equipped with a detachable and disposable probe tip containing a charge of fluid the pressure of which changes with temperature. The tip seals to extensible bellows which operates a dial indicator to show the temperature reading. A reset button is provided to lock the indicator at the recorded temperature until manually released.

5 Claims, 5 Drawing Figures

PATENTED AUG 1 1972 3,680,385

INVENTORS
ROBERT J. MORAN
LOUIS P. MARSILIA

BY *Morse, Altman & Oates*

ATTORNEYS 3,680,385

DIAL THERMOMETER

CROSS-REFERENCE TO RELATED APPLICATIONS

This application discloses improvements over co-pending, commonly assigned U.S. Pat. application, Ser. No. 722,973, filed Apr. 22, 1968, and now Pat. No. 3,521,490, for "Temperature Measuring Instrument".

BACKGROUND OF THE INVENTION

1. Field of the Invention

This invention relates generally to temperature measuring devices and more particularly is directed towards a new and improved medical thermometer having a direct reading dial face and a disposable probe tip.

2. Description of the Prior Art

The most common medical thermometer is the conventional mercury filled glass thermometer which, while widely used in practice, has certain serious deficiencies. Characteristically, glass thermometers are easily broken and are not particularly accurate. Furthermore, conventional thermometers must be sterilized after each use with the result that a large number of thermometers must be kept on hand in hospitals and the like where they are in frequent use. Other types of temperature measuring instruments and systems such as electronic devices as well as chemical type recorders have been available but these generally are quite complex, expensive and not particularly portable.

In the above-identified application there is disclosed a dial-type thermometer operated by a fluid charged bellows which is fast acting, of high precision and which is particularly useful for medical purposes.

It is a general object of the present invention to provide improvements in the dial-type thermometer disclosed in the above-identified application. It is a further object of this invention to provide a dial-type thermometer of improved design and construction having a reduced number of parts and a disposal probe tip to eliminate the need of sterilization between each use.

SUMMARY OF THE INVENTION

This invention features a dial-type thermometer, comprising a sealed housing, an expansible bellows within the housing, a dial indicator drivingly connected to the bellows and provided with a non-linear scale corresponding to the travel characteristics of the bellows and a detachable probe tip charged with an expansible temperature responsive fluid. The fluid pressure changes with temperature to expand or contract the bellows and actuate the dial indicator accordingly. A sealed reset device is provided for locking the indicator at a measured temperature reading.

DETAILED DESCRIPTION OF THE PREFERRED EMBODIMENTS

Figure 1:
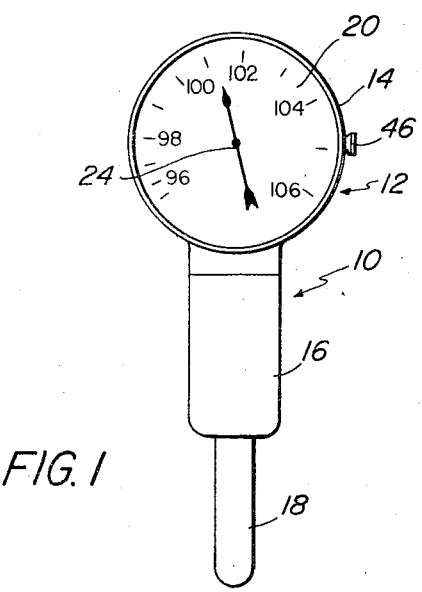
FIG. 1 is a view in front elevation of a dial thermometer made according to the invention.
Figure 2:
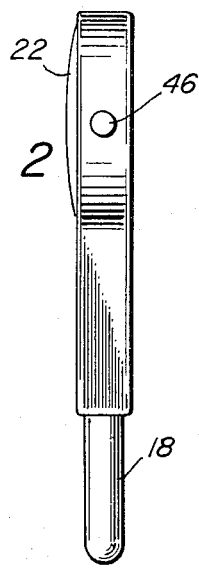
FIG. 2 is a view in side elevation thereof.

Referring now to the drawings, the reference character 10 indicates a dial thermometer generally organized about a sealed housing 12 formed with a circular upper portion 14 and a generally cylindrical lower shank portion 16 in communication therewith. A disposable probe tip 18 is detachably connected to the lower end of the shank portion 16 by means of a quick-acting coupling to be described below. The upper circular portion 14 of the housing is provided with a circular dial face 20 bearing thereon a non-linear scale over a range of temperatures of normal interest. As a clinical thermometer, the range typically would run between 95° F. and 106° F. In the illustrated embodiment, the spacing increments increase as the temperature rises for reasons to be explained below. The dial face is enclosed by a transparent cover 22 which is marginally sealed to the housing 12 and an indicator needle 24 is mounted between the cover 22 and the dial face to indicate temperature.

Figure 3:
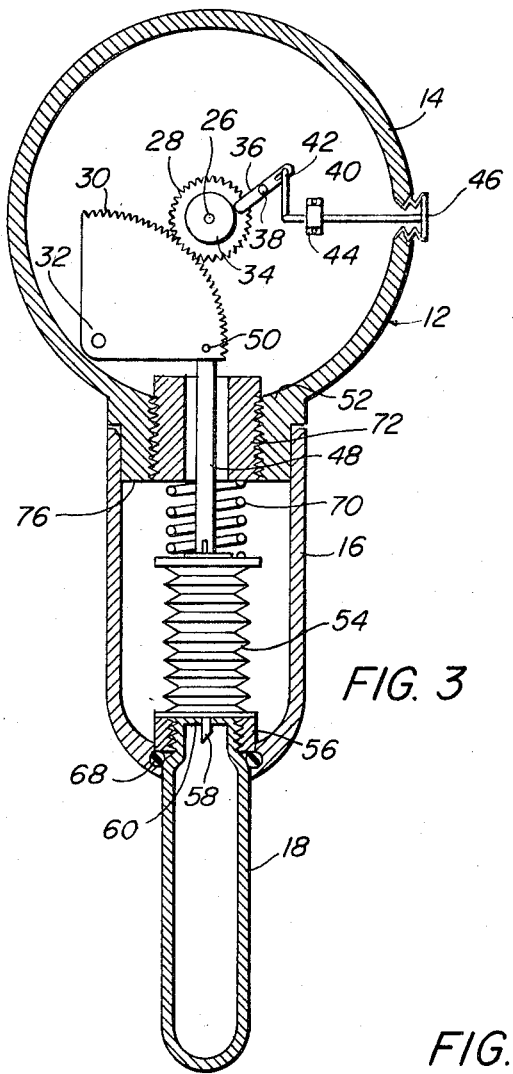
FIG. 3 is a sectional view in front elevation thereof, and, FIGS. 4 and 5 are detailed sectional views in front elevation showing modifications of the invention.

As shown in the drawings, the indicator needle 24 is fixed to a stub shaft 26 which, in turn, is coaxial with and fixed to a pinion gear 28 rotatably mounted within the circular portion 14 of the housing. The pinion 28 is in mesh with a gear sector 30 pivoted to the housing by means of a pin 32. The pinion 28 is also provided with a smooth cylindrical shoulder 34 against which rides a pawl 36 pivoted about a pin 38. The opposite end of the pawl 36 is formed with a slot and engages the inner end of a stem 40 by means of a pin 42. The stem 40 rides in a guide 44 secured to the housing and its right-hand end, as viewed in FIG. 3, is secured to a reset button 46 in an opening in the side of the housing. The button 46, in the preferred embodiment, is in the form of a small spring bellows which is sealed to the side wall of the housing about the opening and the outer end of the bellows is closed to maintain a sealed condition within the housing.

In practice, when the thermometer is operated, the gear sector 30 will rotate counterclockwise and the pinion 28, together with the indicator needle 24 will rotate clockwise to a position on the dial face corresponding to the measured temperature. At the same time, the cylindrical portion 34 of the pinion will rotate smoothly under the tip of the pawl 36 without restriction. However, when the pinion stops rotating, the free end of the pawl will lock against the cylindrical surface by reason of its angular position in relation to the cylindrical surface and also under the biasing force of the spring bellows reset button 46 working through the stem 40 and linkage 42. In this fashion, the maximum measured temperature will remain displayed on the dial face until the reset button 46 is depressed to allow the indicator to drop back to a start position. By pressing the reset button, the stem 40 will pivot the tip of the pawl away from the cylindrical portion 34 to release the pinion allowing it to rotate counterclockwise.

Figure 4:
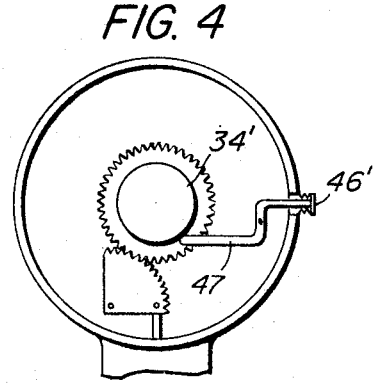
Figure 5:
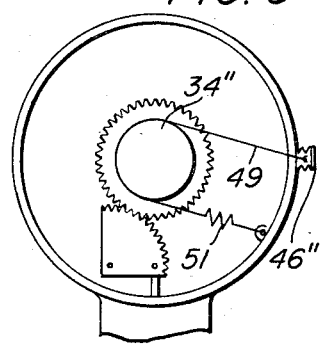

FIGS. 4 and 5 illustrate modification of the indicator needle lock mechanism. In FIG. 4 an offset lever 47 is pivoted to the housing and has its right-hand end connected to a reset button 46' while its left-hand end rides angularly against a cylindrical portion 34' as in the principal embodiment. The FIG. 5 embodiment utilizes a spring-loaded friction band 49 looped about a cylindrical surface 34" and secured at one end to a reset button 46" and at the other end to the inner wall of the housing. A light spring 51 is employed to keep sufficient tension on the band to lock the needle until released.

Connected tangentially to the gear sector 30 by a pin 50 is a drive rod 48 extending through a wall 52 formed in the housing 12 between the upper and lower sections 14 and 16. The lower end of the rod 48 is drivingly connected to the upper end of an extensible spring bellows 54 contained within the cylindrical shank portion of the housing and parallel to the rod 48 and probe 18. The lower end of the bellows 54 is seated in sealing engagement against an annular coupling member 56 which is also sealed against the walls of shank portion 16.

The coupling member 56 is internally threaded for engagement with the threaded upper end of the probe 18. Preferably the threads provide a quarter turn to lock or unlock a probe tip 18. The lower end of the bellows 54 is also provided with a tubular needle 58 adapted to puncture a diaphragm 60 which normally seals the mouth of the upper end of the probe 18. The probe tip 18 is hollow and charged with an inexpensive expansible fluid medium such as ethyl chloride, which is non-toxic and which has a temperature-to-pressure curve which is substantially linear over the temperature range of interest. On O-ring 68 is provided about the mouth of the coupling 56 to insure that none of the charge is lost when a tip is attached to the thermometer.

In practice, the thermometer will be provided with a number of disposable tips, a new tip being installed for each patient to prevent the spread of infection. Each probe tip is removed by merely twisting it out of the coupling whereupon it may be discarded. A fresh probe is then twisted into place to seal against the base of the bellows, the fluid contained in the tip thereby communicating with the bellows through the needle 58. When the probe tip 18 is placed in a mouth of a patient, the heat will cause an increase in pressure of the fluid charge and this, in turn, will cause the bellows 54 to expand in an axial direction, pushing against the rod 48. This will rotate the gear sector 30, the pinion 28 and the indicator needle 24 to display the patient's temperature.

Insofar as the bellows 54 has a characteristic spring rate, a compensating spring 70 is trapped between the upper end of the bellows and the annular lower shoulder of a threaded tubular insert 72. The insert 72 is threaded to a collar or neck 76 extending down from the wall 52 and may be raised or lowered by turning the faceted upper end thereof. Thus the force of the spring 70 may be adjusted to compensate for manufacturing variations of the bellows 54. Since the bellows' travel is non-linear as it extends and contracts, compensation is made by the use of the non-linear scale on the dial face as previously mentioned. The scale is matched to the travel of the bellows so that an extremely accurate temperature reading is insured.

By providing a housing which is completely sealed against the atmosphere, the instrument is not affected by changes in atmospheric pressure which would otherwise introduce errors into the operation of the instrument.

Having thus described the invention, what we claim and desire to obtain by Letters Patent of the United States is:

1. A dial thermometer, comprising
  a. a sealed housing,
  b. an extensible bellows mounted in said housing,
  c. a fluid charged probe connected to said bellows and extending out from said housing,
  d. a dial face bearing a non-linear scale mounted to said housing,
  e. an indicator movably mounted with respect to said face,
  f. meshed gears rotatably mounted in said housing and drivingly connected to said indicator,
  g. a connecting member drivingly engaging said bellows and one of said gears,
  h. a spring bearing at one end against said bellows in a direction opposite to its direction of movement,
  i. a member threaded to said housing and bearing against another end of said spring for adjusting the compresion thereof,
  j. one of said gears being formed with a smooth annular surface,
  k. a locking member movably mounted to said housing for engagement with said surface,
  l. release means connected to said locking means and manually operable externally of said housing, and
  m. a spring bellows extending through said housing and sealed thereto, said bellows being operatively connected to said release means and normally urging said release means and said locking means into a locked position.

2. A dial thermometer according to claim 1 wherein said locking member includes a pawl pivoted to said housing and having one end thereof normally bearing against said surface.

3. A dial thermometer according to claim 1 wherein said one of said gears is a sector of a gear and said connecting member is connected eccentrically thereto.

4. A dial thermometer, comprising
  a. a sealed housing,
  b. an extensible bellows mounted in said housing,
  c. a fluid charged probe detachably connected to said bellows and extending out from said housing,
  d. said probe being formed with a sealed diaphragm at the end thereof connectable to said bellows,
  e. a needle mounted to said housing in position to puncture said diaphragm upon connection of said probe,
  f. a dial face bearing a non-linear scale mounted to said housing,
  g. an indicator movably mounted with respect to said face,
  h. meshed gears rotatably mounted in said housing and drivingly connected to said indicator,
  i. a connecting member drivingly engaging said bellows and one of said gears,
  j. a spring bearing at one end against bellows in a direction opposite to its direction of movement, and,
  k. a member threaded to said housing and bearing against another end of said spring for adjusting the compression thereof.

5. A dial thermometer, comprising
  a. a housing
  b. an extensible bellows mounted to said housing, c. a fluid charged probe detachably connected to said bellows and extending out from said housing,
d. said probe being formed with a sealed diaphragm at the end thereof connectable to said bellows,
e. puncture means mounted to said housing in position to puncture said diaphragm upon connection of said probe,
f. a dial face mounted to said housing,
g. an indicator movably mounted with respect to said face,
h. linear to rotary motion converting means mounted to said housing and drivingly connected to said indicator and to said bellows whereby said indicator is rotated by expansion and contraction of said bellows in response to temperature changes at said probe.

* * * * *